United States Patent Office 3,417,149
Patented Dec. 17, 1968

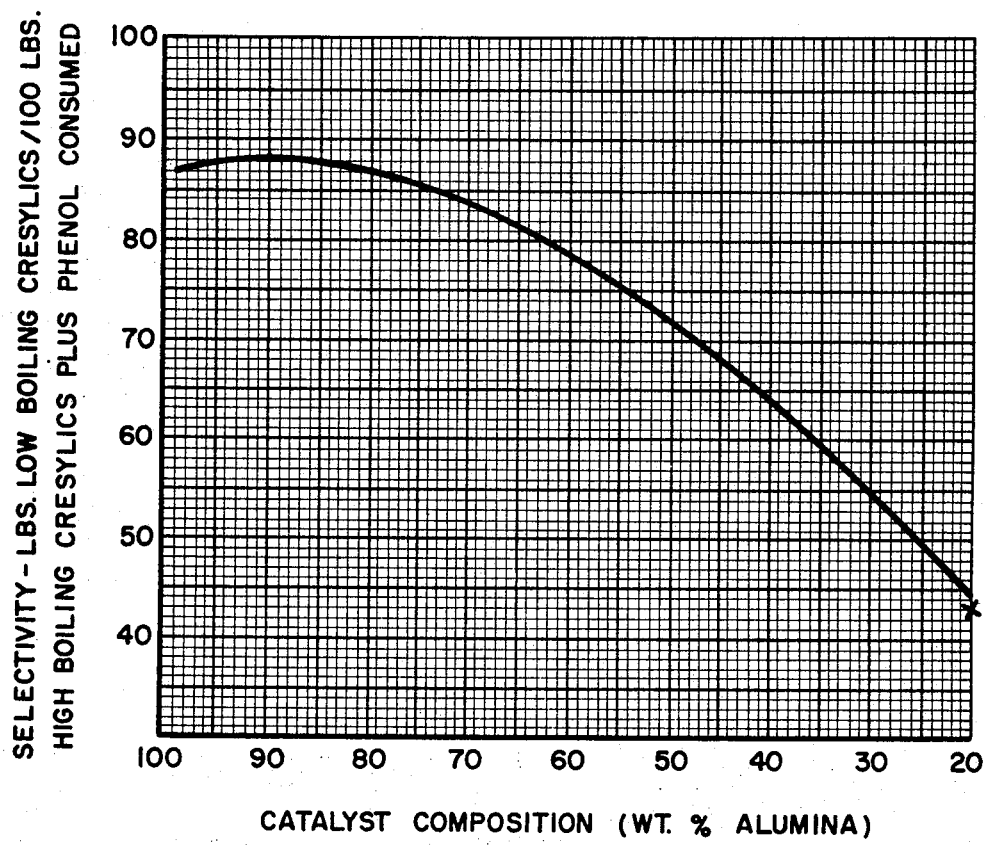

3,417,149
TRANSMETHYLATION OF METHYL-SUBSTITUTED PHENOLS
Martin B. Neuworth, Pittsburgh, Eneo C. Moroni, Bethel Park, and Elsio Del Bel, Library, Pa., assignors to Consolidation Coal Company, Pittsburgh, Pa., a corporation of Delaware
Continuation-in-part of application Ser. No. 534,810, Mar. 16, 1966. This application Dec. 4, 1967, Ser. No. 687,680
7 Claims. (Cl. 260—621)

ABSTRACT OF THE DISCLOSURE

A process for the transfer of methyl groups from a phenol containing two or more methyl groups to either phenol itself or a cresol, wherein a catalyst consisting essentially of 100 to 75 percent by weight of alumina and 0 to 25 percent by weight of silica is used at a temperature between 350 and 500° C.

---

This application is a continuation-in-part of our copending application, Ser. No. 534,810, filed Mar. 16, 1966, now abandoned.

The present invention relates to a catalytic process for transferring methyl groups from one phenol to another; and, more particularly, to the transfer of methyl groups from a donor phenol containing two or more methyl groups to an acceptor phenol which is either phenol itself or a cresol.

The transmethylation of methyl-substituted phenols may be illustrated by the following reaction.

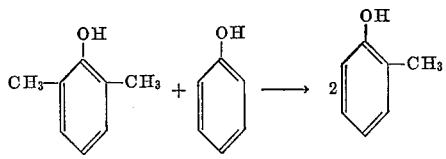

Such transmethylation reactions are found to occur over cracking catalysts under somewhat more severe conditions than are normally employed in cracking (Catalysis, vol. VI, p. 431, by Paul H. Emmett, 1958). Synthetic alumina-silica catalysts are well known and widely used cracking catalysts. Such catalysts contain up to about 30 percent alumina, the balance consisting essentially of silica. Those catalysts which contain between 15 and 30 percent alumina are called high alumina catalysts to distinguish them from the early, more popular alumina-silica catalysts containing less than 15 percent alumina. Neither silica nor alumina alone is a good cracking catalyst (Catalysis, vol. VII, p. 25, by Paul H. Emmett, 1960).

The reaction of phenol with a 2,4-dialkylphenol to yield a mono-alkylphenol is described in U.S. Patent No. 2,578,597. Silica-alumina is used to catalyze the reaction and contains a major proportion of silica and a minor proportion of alumina, generally not in excess of ten percent by weight. No quantitative yields are reported. Nor is transmethylation, as distinguished from transalkylation, referred to specifically. U.S. Patent No. 2,777,881 describes transmethylation of phenols over silica-alumina catalysts. Again though, in line with the prevailing thinking, the catalysts which are described in the patent contained 1–50 percent by weight of alumina and 99–50 percent by weight of silica, and preferably 1 to 20 percent of alumina and 99 to 80 percent silica.

Natural or synthetic aluminosilicates are used as co-catalysts with strong acids in the process of transalkylation described in U.S. Patent No. 3,014,079. The aluminosilicates or clays employed contain predominantly silica and a minor amount of alumina. Furthermore, transmethylation is not specifically discussed, and all the examples relate to higher alkyl phenols.

Finally, the transmethylation of alkylphenols including methyl-substituted phenols is described in British Patent No. 695,464. Suitable catalysts for the process include silica-alumina catalysts. Those which were "found effective all contain silica as the major constituent (70–95 moles percent)."

Our own investigations confirmed the results reported in the patent and technical literature, namely, that catalytic isomerization, disproportionation, and transalkylation of methyl-substituted phenols can be effected with conventional silica-alumina cracking catalysts. The latter usually consisted of 85 percent silica and 15 percent alumina. When high surface area silica-alumina catalysts were used, we found that considerable carbon laydown occurred in the initial stages of the conversion, and the catalysts contained 15 to 20 percent by weight of carbon when the conversion cycle was completed. These carbon levels are too high to burn off in any reasonable period of time. Dilution by steam had been proposed by Given in his above-cited British Patent No. 695,464. However, this expedient does not give high yields of low boiling phenols, even when phenol is used as an acceptor. Subsequent studies in our laboratories evaluated low surface area silica-alumina catalysts (85 percent silica-15 percent alumina). Large amounts of high boiling neutral compounds were produced during transmethylation of high boiling xylenols and phenol. The yield of these high boiling neutral compounds was 25 percent, based on converted high boiling xylenols and phenol. It was quite apparent to us that the conventional silica-alumina cracking catalysts were not commercially feasible catalysts for the transmethylation of methyl-substituted phenols.

Despite the teaching of the prior art that acidic catalysts should be used in the conversion of methyl-substituted phenols, it occurred to us that perhaps pure alumina or catalysts containing predominantly alumina would be effective since such catalysts are relatively inactive promoters of cracking, and hence might simply promote methyl group transfer. The results not only confirmed this speculation, but far exceeded our most optimistic hopes.

In accordance with the present invention, a catalytic process is provided for the transmethylation of methyl-substituted phenols which comprises heating a phenol containing at least two methyl groups (donor) and a phenol which is either phenol itself or a cresol, in the vapor phase in the presence of a catalyst consisting essentially of 75 to 100 percent by weight of alumina, preferably at least 80 percent, and 0 to 25 percent by weight of silica, at a temperature between 350 and 500° C., preferably between 375 and 500° C. The effect of pressure is not particularly significant, atmospheric being quite satisfactory.

No extraneous hydrogen is added or required in the process.

The improved results obtained by the process of this invention are graphically demonstrated in the drawing. The selectivity of the process, expressed as pounds (lbs.) of low boiling cresylics per 100 pounds of high boiling cresylics plus phenol consumed, is plotted against the composition of the silica-alumina catalyst expressed simply as weight percent alumina. The necessary data were obtained by reacting phenol with a high boiling cresylic acid fraction (consisting essentially of di- and trimethyl-substituted phenols boiling between 225 and 250° C.) in the vapor phase at 425° C. in the presence of silica-alumina catalysts containing a range of alumina content. It will be noted that as the alumina content is decreased below an optimum amount, the selectivity decreases. Selectivities of 86 to 88 percent are observed when using the preferred catalysts and decrease to 66 to 73 percent when low alumina content catalysts are used. The point in the drawing identified by "X" is the selectivity obtained in Example 9 of the above-cited British Patent No. 695,464.

For a better understanding of the present invention, its objects and advantages, reference should be had to the following examples.

Example 1.—Transmethylation of phenol and high boiling cresylic acids

Phenol and a high boiling cresylic acid fraction (225 to 250° C.) were mixed in an equimolar ratio. The resulting feed mixture had the following composition expressed in weight percent: phenol—40.6; trimethylphenols ($C_9$'s)—53.7

2,3-+2,3,6-methylphenols—4.2; 2,4-+2,5 - xylenols—1.1; and 3,4-xylenol—0.4.

The effect of catalyst, temperature, liquid hourly space velocity (LHSV), and residence time upon the reaction of phenol and the high boiling cresylic acid in the above feed mixture was determined in a series of runs. All the catalysts contained alumina. The properties and composition of these catalysts are tabulated in Table I below.

TABLE I.—PROPERTIES AND COMPOSITION OF CATALYST

| Catalysts | A | B | C | D |
|---|---|---|---|---|
| Surface Area (m.²/g.) | 180–200 | 185 | | 90–100 |
| Pore Volume | 0.42–0.51 | | | |
| Avg. Pore Dia. (A.): | 99 | | | |
| $Al_2O_3$ | 99.0 | 81.5 | ~50 | 45.0 |
| $SiO_2$ | <0.10 | 10.5 | ~50 | 53.0 |
| $Fe_2O_3$ | 0.005 | 3.0 | | 0.3 |
| $Na_2O$ | | 0.35 | | |
| $TiO_2$ | | | 3.5 | |

The runs were made in a reactor which consisted of one and one-half inch stainless steel pipe, two feet long, surrounded by a circulating molten salt bath. The upper one-third of the pipe was packed with one-eighth inch stainless steel balls to serve as a vaporizing section. The middle section contained a 250 ml. catalyst bed supported by stainless steel textile in the lower section.

The molten salt bath was heated to and kept at the desired reaction temperature by four independently controlled electric heaters. The catalyst bed was purged with nitrogen for a 20-minute period to remove the air. Then the feed was introduced into the reactor at atmospheric pressure by means of a syringe-type pump. The liquid condensate was collected in a distilling flask and the uncondensed vapors passed through a Dry-Ice trap and a wet test meter. At the completion of the run, the reactor was purged with nitrogen for a 30-minute period to remove any liquid feed.

The product was distilled under reduced pressure in a 10 mm. diameter, 36-inch long spinning band column. The —250° C. fraction (i.e. the fraction boiling *below* 250° C.) was analyzed by gas chromatography to determine its product distribution. The "Make-Product" was determined by subtracting from the total —250° C. fraction that which is unconverted feedstock. The +250° C. fraction (i.e. the fraction boiling *above* 250° C.) is largely neutral hydrocarbons and of little or no value.

The results of the series of runs are tabulated in Tables II and III below.

TABLE II

| Run No | 1 | 2 | 3 | 4 | 5 |
|---|---|---|---|---|---|
| Catalyst | A | A | B | B | B |
| Temperature (° C.) | 425 | 450 | 400 | 425 | 450 |
| LHSV (hr. ⁻¹) | 0.5 | 0.5 | 1.0 | 1.0 | 1.0 |
| Time (hrs.) | 3.0 | 3.0 | 1.0 | 1.0 | 1.0 |
| Products (wt. percent): | | | | | |
| —250° C. Fraction | 94.2 | 86.4 | 95.4 | 94.6 | 91.8 |
| +250° C. Fraction | 3.0 | 7.2 | 2.7 | 3.5 | 4.1 |
| Gas+Carbon | 2.8 | 4.0 | 1.6 | 0.5 | 1.9 |
| Water | | 2.4 | 0.3 | 1.4 | 2.2 |
| Composition of Make-Product (expressed as wt. percent): | | | | | |
| Light Ends | | 4.1 | 3.4 | 0.9 | 1.4 |
| o-Cresol | 21.5 | 21.3 | 21.9 | 24.6 | 25.9 |
| 2,6-Xylenol | 0.5 | 1.7 | 0.0 | 0.0 | 0.0 |
| m-, p-Cresols | 35.1 | 35.4 | 35.4 | 39.1 | 39.6 |
| o-Ethylphenol | 7.2 | 7.0 | 10.3 | 7.7 | 6.8 |
| 2,4- 2,5-Xylenols | 9.8 | 10.2 | 3.4 | 8.5 | 9.9 |
| 2,4,6- | 1.3 | 0.0 | 1.0 | 0.0 | 0.0 |
| 2,3- 2,3,6- | 24.3 | 20.3 | 21.2 | 19.2 | 16.4 |
| 3,4-Xylenol | 0.3 | 0.0 | 3.4 | 0.0 | 0.0 |
| Conversion (wt. percent of total feed) | 38.7 | 44.8 | 29.2 | 35.3 | 41.4 |
| Selectivity [1] | 86.5 | 76.6 | 86.2 | 86.7 | 83.5 |
| Phenol Conversion (wt. percent of phenol in feed) | 24.1 | 42.4 | 17.2 | 23.9 | 29.5 |
| $C_9$ Conversion (wt. percent of $C_9$'s in feed) | 66.7 | 69.6 | 45.2 | 52.2 | 63.4 |

[1] Wt. percent yield based on consumed cresylic acids plus phenol.

TABLE III

| Run No | 6 | 7 | 8 | 9 | 10 |
|---|---|---|---|---|---|
| Catalyst | B | C | C | C | D |
| Temperature (° C.) | 425 | 400 | 425 | 450 | 425 |
| LHSV (hr. ⁻¹) | 0.5 | 1.0 | 0.5 | 1.0 | 0.5 |
| Time (hrs.) | 3.0 | 0.5 | 3.0 | 0.5 | 3.0 |
| Products (wt. percent): | | | | | |
| —250° C. Fraction | 93.8 | 89.7 | 83.3 | 83.9 | 86.3 |
| +250° C. Fraction | 3.3 | 3.0 | 11.9 | 10.6 | 9.4 |
| Gas+Carbon | 2.9 | 5.2 | 4.8 | 3.9 | 3.5 |
| Water | | 2.1 | | 1.6 | |
| Composition of Make-Product (expressed as wt. percent): | | | | | |
| Light Ends | 0.4 | 2.5 | 1.1 | 3.2 | 1.3 |
| o-Cresol | 20.5 | 25.1 | 23.3 | 29.5 | 18.4 |
| 2,6-Xylenol | 1.3 | 1.5 | 2.0 | 1.2 | 1.3 |
| m-, p-Cresols | 35.1 | 40.0 | 38.2 | 43.5 | 34.1 |
| o-Ethylphenol | 7.8 | 6.4 | 6.2 | 4.7 | 8.2 |
| 2,4- 2,5-Xylenols | 10.9 | 9.1 | 11.4 | 8.2 | 13.0 |
| 2,4,6- | 0.9 | 0.2 | 0.2 | 0.0 | 0.7 |
| 2,3- 2,3,6- | 23.1 | 15.0 | 17.6 | 9.7 | 23.0 |
| 3,4-Xylenol | 0.0 | 0.2 | 0.0 | 0.0 | |
| Conversion (wt. percent of total feed) | 44.8 | 40.6 | 45.5 | 40.1 | |
| Selectivity | 88.0 | 79.8 | 73.0 | 71.4 | 66.5 |
| Phenol Conversion (wt. percent of phenol in feed) | 30.8 | 16.0 | 30.8 | 22.4 | 28.8 |
| $C_9$ Conversion (wt. percent of $C_9$'s in feed) | 73.5 | 74.8 | 90.5 | 79.4 | |

Example 2

The conditions for and results of the reaction between 2,6-xylenol and phenol are tabulated in Table IV below. The apparatus, experimental and analytical procedures used in Example 1 were used in making the runs reported in Table IV.

TABLE IV

| Run No | 11 | 12 | 13 | 14 | 15 | 16 |
|---|---|---|---|---|---|---|
| Catalyst | A | A | A | A | A | A |
| Temperature (° C.) | 400 | 425 | 450 | 400 | 425 | 450 |
| LHSV (hr. ⁻¹) | 0.5 | 0.5 | 0.5 | 1.0 | 1.0 | 1.0 |
| Time (hrs.) | | | | | | |
| Feed (Mole Ratio) | (1) | (1) | (1) | (1) | (1) | (1) |
| Products (wt. percent): | | | | | | |
| —250° C. Fraction | 98.2 | 98.7 | 96.4 | 99.0 | 98.9 | 96.8 |
| +250° C. Fraction | 0.6 | 1.3 | 2.3 | 0.5 | 0.5 | 1.7 |
| Gas + Carbon | 1.2 | 0.0 | 1.3 | 0.5 | 0.6 | 1.5 |
| Water | | | | | | |
| Composition of Make-Product (expressed as wt. percent): | | | | | | |
| o-Cresol | 33.8 | 46.4 | 34.6 | 48.5 | 49.6 | 43.9 |
| m,p-Cresol | 10.0 | 22.8 | 33.2 | 8.3 | 15.5 | 26.8 |
| 2,4- 2,5-Xylenol | 42.0 | 19.5 | 17.2 | 34.6 | 23.7 | 19.0 |
| 2,4,6-tri | 0.3 | 0.5 | 0.6 | | 0.3 | 0.7 |
| 2,3- 2,3,6- | 13.2 | 9.1 | 9.1 | 8.8 | 7.6 | 7.3 |
| 3,4-Xylenol | 0.3 | 0.7 | 2.4 | | 0.3 | 1.1 |
| $C_9$'s | 0.3 | 0.7 | 2.7 | | | 0.5 |
| 2,6-xylenol Reacted (wt. percent 2,6-xylenol in feed) | 43.4 | 77.0 | 91.4 | 28.3 | 50.5 | 75.0 |
| Phenol Reacted (wt. percent of phenol in feed) | 24.6 | 31.3 | 39.1 | 9.2 | 23.4 | 35.2 |

[1] 2,6-xylenol: phenol (1.0).

Examples 3 and 4

The conditions for and results of the reaction between 2,6-xylenol and m-cresol (Example 3) and of the reaction between 2,4,6-trimethylphenol and phenol (Example 4) are tabulated in Table V below. The apparatus, experimental and analytical procedures used in Example 1 were used in making the runs reported in Table V.

TABLE V

|  | Example 3 | | Example 4 |
|---|---|---|---|
| Run No. | 17 | 18 | 19 |
| Catalyst | A | A | A |
| Feed (mole ratio) | (1) | (1) | (2) |
| Temperature (° C.) | 425 | 450 | 425 |
| LHSV (hr.⁻¹) | 1.0 | 1.0 | 1.0 |
| Products (wt. percent): | | | |
| −250° C. Fraction | 99.0 | 95.8 | 93.5 |
| +250° C. Fraction | 0.5 | 1.5 | 1.4 |
| Gas + Carbon | 0.5 | 2.7 | 3.0 |
| Water | | | 2.1 |
| Composition of Make-Product (wt. percent): | | | |
| Light Ends | 0.2 | 2.4 | |
| Phenol | 10.4 | 13.2 | |
| 2,6-Xylenol | | | 1.8 |
| o-Cresol | 25.5 | 22.8 | 33.1 |
| m-, p-Cresol | | | 15.8 |
| 2,4- 2,5-Xylenol | 38.0 | 30.6 | 24.1 |
| 2,4, 6-Tri | 1.0 | 2.3 | |
| 2,3- 2,3,6- | 19.6 | 19.2 | 2.1 |
| 3,4-Xylenol | 1.8 | 2.9 | 7.9 |
| C₉'s | 2.6 | 6.5 | 15.3 |
| 2,6-Xylenol Reacted (wt. percent of 2,6-xylenol in feed) | 58.8 | 80.1 | |
| Phenol Reacted (wt. percent of phenol in feed) | | | 49.4 |
| m-Cresol Reacted (wt. percent of m-Cresol in feed) | 43.2 | 50.5 | |
| 2,4,6-Trimethylphenol Reacted (wt. percent of trimethylphenol in feed) | | | 75.0 |

¹ 2,6-xylenol: m-cresol (1.0).
² 2,4,6-trimethylphenol: phenol (1.0).

Example 5

The conditions for and results of the reaction between phenol and a high boiling cresylic acid fraction are tabulated in Table VII below. The apparatus, experimental and analytical procedures used in Example 1 were used in making the runs reported in Table VII.

The composition of the high boiling cresylic acid fraction is tabulated below in Table VI. The feed mixture of phenol and the high boiling cresylic acid fraction contained 40.5 weight percent of phenol. The catalyst employed was a very pure activated alumina containing, in the calcined state, 99.9+% Al₂O₃.

TABLE VI

| Composition: | High boiling cresylic acid fraction |
|---|---|
| Phenol | 0.1 |
| Cresols (o-, m-, and p-) | 1.4 |
| 2,6-xylenol | 1.0 |
| 2,4- and 2,5-xylenol | 0.6 |
| 2,4,6-trimethylphenol | 0.4 |
| 2,3-xylenol and 2,3,6-trimethylphenol | 6.7 |
| 3,4-xylenol | 0.2 |
| 2,3,5- and 2,4,5-trimethylphenol | 6.5 |
| 2,3,4- and 3,4,5-trimethylphenol | 4.1 |
| 2,3,4,6- and 2,3,5,6-tetramethylphenol | 49.4 |
| 2,3,4,5-tetramethylphenol | 15.0 |
| Pentamethylphenols | 8.9 |
| Unidentified | 5.7 |

TABLE VII

| Run No. | 20 | 21 | 22 |
|---|---|---|---|
| Temperature (° C.) | 375 | 400 | 425 |
| LHSV (hr.⁻¹) | 0.5 | 0.5 | 0.5 |
| Time (hrs.) | 5 | 5 | 5 |
| Products (wt. percent): | | | |
| −250° C. Fraction | 90.6 | 86.0 | 83.4 |
| +250° C. Fraction | 2.6 | 5.0 | 8.5 |
| Gas + Carbon | 6.8 | 9.0 | 8.1 |
| Composition of −250° C. Fraction (wt. percent): | | | |
| Water | 1.3 | 2.0 | 2.8 |
| Light Ends | 0.7 | 1.3 | 2.6 |
| Phenol | 9.3 | 5.4 | 5.2 |
| o-Cresol | 16.2 | 11.8 | 10.9 |
| 2,6-Xylenol | 6.1 | 5.8 | 4.8 |
| m-, p-Cresols | 9.6 | 12.5 | 14.6 |
| 2,4-, 2,5-Xylenols | 15.1 | 19.1 | 19.3 |
| 2,4,6-Trimethylphenol | 4.5 | 4.8 | 4.3 |
| 2,3-Xylenol and 2,3,6-Trimethylphenol | 12.2 | 15.0 | 15.3 |
| 3,4-Xylenol | 3.9 | 4.6 | 4.6 |
| C₉'s | 21.1 | 17.7 | 15.6 |
| | 100.0 | 100.0 | 100.0 |
| Composition of Make-Product (wt. percent): | | | |
| Water | 2.1 | 2.8 | 3.8 |
| Light Ends | 1.1 | 1.8 | 3.7 |
| o-Cresol | 24.4 | 15.6 | 13.8 |
| 2,6-Xylenol | 8.6 | 7.3 | 5.7 |
| m-, p-Cresols | 15.3 | 18.0 | 20.3 |
| 2,4-, 2,5-Xylenols | 23.4 | 26.7 | 26.0 |
| 2,4,6-Trimethylphenol | 6.8 | 6.5 | 5.7 |
| 2,3-Xylenol and 2,3,6-Trimethylphenol | 12.3 | 14.8 | 14.6 |
| 3,4-Xylenol | 6.0 | 6.5 | 6.4 |
| | 100.0 | 100.0 | 100.0 |

According to the provisions of the patent statutes, we have explained the principle, preferred construction, and mode of operation of our invention and have illustrated and described what we now consider to represent its best embodiment. However, we desire to have it understood that, within the scope of the appended claims, the invention may be practiced otherwise than as specifically illustrated and described.

We claim:

1. A process for the catalytic transmethylation of methyl-substituted phenols which comprises heating a mixture of a first phenol containing at least two methyl groups and a second phenol selected from the class consisting of phenol itself and cresols, said first phenol and said second phenol containing no substituents other than methyl, in the vapor phase at a temperature between 350 and 500° C. in the presence of a catalyst consisting essentially of 100 to 75 percent by weight of alumina and 0 to 25 percent by weight of silica, thereby effecting transmethylation from said first phenol to said second phenol.

2. The process of claim 1 wherein the catalyst contains at least 80 percent by weight of alumina.

3. The process of claim 2 wherein the temperature is between 375 and 425° C.

4. The process of claim 3 wherein said first phenol is a mixture of cresols and xylenols and said second phenol is phenol itself.

5. The process of claim 3 wherein said first phenol is 2,6-xylenol and said second phenol is phenol itself.

6. The process of claim 3 wherein said first phenol is 2,6-xylenol and said second phenol is m-cresol.

7. The process of claim 3 wherein said first phenol is 2,4,6-trimethylphenol and said second phenol is phenol itself.

No references cited.

LEON ZITVER, *Primary Examiner.*

H. ROBERTS, *Assistant Examiner.*